(12) United States Patent
O'Connell

(10) Patent No.: US 10,040,326 B1
(45) Date of Patent: Aug. 7, 2018

(54) VEHICLE HITCH ADAPTER COMPRISING A PITCH LOCK SYSTEM

(71) Applicant: Timothy E. O'Connell, Chico, CA (US)

(72) Inventor: Timothy E. O'Connell, Chico, CA (US)

(73) Assignee: RESCUE 42, INC., Chico, CA (US)

( * ) Notice: Subject to any disclaimer, the term of this patent is extended or adjusted under 35 U.S.C. 154(b) by 96 days.

(21) Appl. No.: 15/091,434

(22) Filed: Apr. 5, 2016

Related U.S. Application Data

(60) Provisional application No. 62/145,376, filed on Apr. 9, 2015, provisional application No. 62/303,851, filed on Mar. 4, 2016.

(51) Int. Cl.
*B60D 1/42* (2006.01)
*B60D 1/24* (2006.01)
*B60D 1/46* (2006.01)
*B60D 1/02* (2006.01)

(52) U.S. Cl.
CPC ............ *B60D 1/247* (2013.01); *B60D 1/025* (2013.01); *B60D 1/46* (2013.01)

(58) Field of Classification Search
CPC . B60D 1/44; B60D 1/46; B60D 1/465; B60D 1/065; B60D 1/247; B60D 1/52; B60D 1/025; B60R 9/06
USPC .................................................. 224/519–521
See application file for complete search history.

(56) References Cited

U.S. PATENT DOCUMENTS

| | | | |
|---|---|---|---|
| 1,723,320 A | 8/1929 | Libelman | |
| 4,033,601 A * | 7/1977 | Lindahl | B60D 1/46 280/490.1 |
| 4,662,647 A | 5/1987 | Calvert | |
| 4,741,660 A | 5/1988 | Kent | |
| 5,366,338 A | 11/1994 | Mortensen | |
| 5,465,991 A * | 11/1995 | Kass | B60D 1/06 280/406.2 |
| 5,816,763 A | 10/1998 | Hamann | |

(Continued)

OTHER PUBLICATIONS

Korean Intellectual Property Office (KIPO), international search report and written opinion dated Oct. 25, 2017, PCT international application No. PCT/US2017/047037, pp. 1-11, with claims searched, pp. 12-17.

*Primary Examiner* — Scott McNurlen
(74) *Attorney, Agent, or Firm* — O'Banion & Ritchey LLP; John P. O'Banion; Audrey A. Millemann

(57) ABSTRACT

Vehicle hitch adapter comprising a height adjustment post comprising a plurality of pairs of opposed spaced apart height adjustment apertures; a mounting box surmounting the post; a pitch lock system comprising a pitch box having spaced apart pitch plates defining a chamber therebetween for an inferior end of the post to pass therethrough with a pair of opposed spaced apart height adjustment apertures contained within the chamber and the pitch plates comprising a set of spaced apart vertically extending angled end obround shaped slots having a lower surface end defining an at rest position and an upper surface end angled to form a shoulder surface defining a potential energy state; and a pin extending through the obround shaped slots and the apertures contained within the chamber wherein the pin is supported on the shoulder surface in the potential energy state during loading and on the lower surface end during transport.

19 Claims, 16 Drawing Sheets

(56) References Cited

U.S. PATENT DOCUMENTS

| | | |
|---|---|---|
| 5,975,553 A | 11/1999 | VanVleet |
| 6,105,843 A | 8/2000 | Dollesin |
| 6,502,845 B1 | 1/2003 | VanVleet |
| 6,575,155 B2 | 6/2003 | Brennan |
| 6,595,398 B2 | 7/2003 | Himel, Jr. |
| 6,612,615 B1 | 9/2003 | Dimand |
| 6,655,895 B1 | 12/2003 | Dahl |
| 6,698,995 B1 | 3/2004 | Bik |
| 6,725,855 B1 | 4/2004 | Brennan |
| 6,802,441 B1 | 10/2004 | DuRant |
| 7,249,771 B1 | 7/2007 | Brennan |
| 7,380,803 B2 | 6/2008 | Thomas |
| 7,506,885 B2 * | 3/2009 | Colibert ................. B60D 1/065 280/405.1 |
| 7,819,128 B2 | 10/2010 | Clark |
| 7,857,344 B2 * | 12/2010 | Hensley ................. B60D 1/065 280/455.1 |
| 8,113,479 B1 | 2/2012 | O'Connell |
| 8,226,106 B2 | 7/2012 | Hensley |
| 9,381,782 B2 * | 7/2016 | Schwennsen ............ B60D 1/52 |
| 2006/0022426 A1 | 2/2006 | Clive-Smith |
| 2006/0062632 A1 | 3/2006 | Jang |
| 2006/0284396 A1 * | 12/2006 | Smith ..................... B60D 1/46 280/490.1 |
| 2009/0050771 A1 | 2/2009 | Horne |
| 2009/0184299 A1 | 7/2009 | Pasto |

* cited by examiner

VEHICLE HITCH ADAPTER COMPRISING A PITCH LOCK SYSTEM

CROSS-REFERENCE TO RELATED APPLICATIONS

This application claims priority under 35 USC Section 119(e) to U.S. Provisional Patent Application No. 62/145,376, filed Apr. 9, 2015, the entire disclosure of which is incorporated herein by reference. This application also claims priority under 35 USC Section 119(e) to U.S. Provisional Patent Application No. 62/303,851, filed Mar. 4, 2016, the entire disclosure of which is incorporated herein by reference.

FIELD

This disclosure relates generally to a vehicle hitch adapter for a vehicle hitch and, in particular, to a vehicle hitch adapter comprising a pitch lock system for a vehicle hitch mounted, inter alia, cargo cart. In one embodiment, the vehicle hitch adapter comprising the pitch lock system is employed for, but not limited to, removably coupling a scissor lifted hitch mounted cargo cart to the rear of a vehicle for transport.

BACKGROUND

Currently, standard vehicle hitch receivers or trailer hitches such as, but limited to, standard two inch vehicle hitch receivers are underutilized. In particular, the standard vehicle hitch receiver attains only four applications: pulling a wheeled trailer, mounting a bicycle-carrying rack, carrying mobility devices such as powered wheel chairs, and carrying cargo platforms for coupling items thereon.

In one form, the cargo carrying platform utilizes a hitch assembly comprising a straight square vertical male tube or pin and a straight square female vertical hitch receiver for coupling the cargo carrying platform to a vehicle for transportation.

This form of hitch assembly is problematic in that, inter alia, a typical user is precluded from getting the straight square vertical male tube or pin attached to a heavy load to slide down the straight square female vertical hitch receiver unless they are substantially in alignment with each other. Any misalignment causes the tube or pin to bind on insertion. If the user is capable of forcing the load and its male tube or pin into alignment so that it engages or inserts, it then binds when the user attempts to pull apart the misaligned coupling.

This problem can be partially alleviated by lubricating the male tube or pin, lining the surfaces with a low friction substance such as Teflon, rounding the male tube or pin nose or adding rollers at the points where the male tube or pin tends to bind.

Notwithstanding, an additional problem that the above delineated hitch assembly engenders is that vehicles such as, but not limited to, SUV or pick-up trucks comprise an unloaded suspension that assumes a particular angle compared to the road or ground that is forward, higher in the rear than the front. Now, with a substantial load on the vehicle hitch receiver or trailer hitch at the very back, the vehicle will squat and this rotates the angle of the vehicle and the load compared to the ground rearward thereby lowering the rear of the newly mounted load dangerously close to the ground.

As a result, there is a need to ameliorate or overcome one or more of the significant shortcomings delineated hereinabove.

SUMMARY

Accordingly, and in one aspect, an embodiment of the present disclosure ameliorates or overcomes one or more of the shortcomings of the know prior art by providing a vehicle hitch adapter comprising a pitch lock system for a vehicle hitch mount employed for, but not limited to, removably coupling a scissor lifted hitch mounted cargo cart to the rear of a vehicle for transport.

In general, and in one aspect, the vehicle hitch adapter comprising the pitch lock system utilizes the weight of a scissor lifted load to impart potential energy into a carrying vehicle suspension system which is released by, for example, an operator to convert the potential energy into kinetic energy to set, with the vehicle hitch adapter, the scissor lifted load into a forward pitched carry angle.

In another aspect, an embodiment of the vehicle hitch adapter provides a pitch lock system which comprises a pitch box and associated pair of pitch lock pins for serving at least three purposes. First, to allow quick height adjustment between vehicles of dissimilar hitch receiver height, to solve the pin misalignment binding problems, and to cause the cart to ride slightly pitched forward.

In one embodiment, the two pitch lock pins are fixed within an inner square vertical tube surmounted by a mounting box having a vertical pin receiver. The inner square vertical tube is slideably located within the pitch box so that the two pitch lock pins pass through two slot pairs located in the pitch box walls which is attached to a trailer tongue inserted into a vehicle receiver tow hitch connected to a vehicle. One of the two slot pairs comprises a pair of opposed, spaced apart, vertically extending angled end obround shaped slots or apertures and the other of the two slot pairs comprises a pair of opposed, spaced apart, vertically extending obround shaped slots or apertures below the angled end obround shaped slots or apertures.

The vertically extending angled end obround shaped slots or apertures each has a sideways (rearward) extension with a generally horizontal notch defining a shoulder or shelf. When the vertical tube or height adjustment post and mounting box are lifted the pitch lock pins slide to the top of their respective slots. Then, when the mounting box is pulled rearward the upper pin will move rearward onto the shoulder or shelf with corresponding rearward rotation of the vertical tube. With the correct pitch and roll adjustment of the vehicle hitch adapter comprising the pitch lock system the vertical tube will remain in the upper or load position due to the cantilever torque from the weight of the offset mounting box holding the upper pin in the rearward load position.

In this load position the vertical receiver hole or medially disposed aperture in the mounting box is movable from being generally vertical such that the whole mounting box can move around to accommodate angular differences between a male round mounting pin and the vertical receiver hole. This eliminates binding as the vertical pin slides into the vertical receiver hole. As the vertical pin starts to enter the vertical receiver the mounting box moves around to slideably receive the pin without binding. When two alignment tabs, one on each side of the mounting pin, come in contact with the top of the mounting box (or fully seat in their holes if completely in rotational alignment) the load starts to transfer from the cart to the carrying vehicle. Note that all the downward force on the carrying vehicle is being applied by the upper pitch lock pin pushing down on the loading shelf at the upper rear of its associated slot since the lower pin hangs in space at the top of its slot. This downward force causes the rear of the vehicle to visibly start to sag, displacing it downward toward the ground.

Once the weight of the cart has caused the carrying vehicles suspension to compress, the operator positions themselves behind the cart and gives the cart a firm forward push toward the carrying vehicle. Since the cart scissor lift is extended and part of the load is being carried by the vehicle this causes the top of the cart to move toward the vehicle pushing the mounting box toward the vehicle and the upper pitch lock pin to slide forward along the mounting shelf and into the vertical plane of the vertical portion of the vertically extending angled end obround shaped aperture or slot.

As soon as the upper pin slides off the load shelf all downward force on the carrying vehicle is removed. The carrying vehicle suspension naturally attempts to raise the vehicle back to its unloaded position. As it does, it raises the lower portion of the hitch adapter assembly which is locked into the vehicle receiver tow hitch. This causes the pitch box with the two slots to travel firmly upward which causes the pitch lock pins to travel to the bottom (transport) position of their slots. Because the upper slot is located closer to the carrying vehicle than the lower slot this action locks the mounting box and cart into a forward pitched transport position. The scissor lift can now be completely raised and locked pulling the wheels off the ground. Because of the forward pitch angle the rear wheels will ride higher than the forward wheels.

During driving the pins tend to stay bottomed in their slots because the forces on the cart are more cantilever and less direct vertical. This side force on the pins causes friction between the pins and the walls of their associated slots and locks them to the bottoms of their slots.

When unloading the operator lowers the scissor lift until the wheels come in contact with the ground. The forward wheels contact the ground first since the vehicle's own suspension energy was used to cause the cart to ride in a forward pitched angle. As load transfers to those wheels the vehicle suspension starts to unload and the rear of the vehicle rises. Everything comes up together until all of the weight of the cart is back onto the scissor lift of the cart. Note that there is now a rearward torque applied to the hitch adapter since the forward wheels contacted first and the rear wheels later. This torque will slightly bind the pitch lock pins into the bottom of their slots. As the operator continues to raise the scissor lift the cart starts to assume the weight of the rear of the vehicle. This continues until the assumed weight of the vehicle is enough to break the torque induced friction of the pitch lock pins in their associated slots. When this happens the pitch box and slots drop and the pitch lock pins rise to the top of their slots. Because of the rearward torque the upper pin is now free to rotate rearward into the load position. The slots are now pushing down on the pins and the upper pin is free to move around. This combination frees all misalignment binding between the vertical pin and receiver, and the abrupt downward pressure of the weight of the vehicle drives the tops of the vertical slots downward on the pins, hammering them downward and pops loose the mounting box with associated vertical receiver hole from the vertical mounting pin. The scissor lift can now raise the upper frame until the freed vertical pin is clear of the mounting box, and the cart can be rolled away.

In one aspect, the vehicle hitch adapter allows cargo cart mobility on the ground and easy removable connectability to the hitch receiver with wheels up for long distance (highway) transport. If the wheels are off the ground the device is not considered a trailer, and does not need insurance, registration or to restrict highway speed.

In another aspect, the vehicle hitch adapter allows for rotating the angle of the attached load forward or anteriorly to counter the rearward rotation of the carrying vehicle. This then lifts the rear of the attached load higher off the ground and alleviates problems in the know art as delineated in the background set forth herein above.

Further aspects of the embodiment(s) of the present disclosure will become apparent from the detailed description provided below, when taken together with the attached drawings and claims. It should be understood, however, that numerous modifications and adaptations may be resorted to without departing from the scope and fair meaning of the claims as set forth below following the detailed description of preferred embodiment(s) of the present disclosure.

BRIEF DESCRIPTION OF THE SEVERAL VIEWS OF THE DRAWINGS

The foregoing summary, as well as the following detailed description of the disclosure, will be more fully understood by reference to the following drawings which are for illustrative purposes only, and are not intended to limit the scope of the present disclosure. Also, it is appreciable that the drawings are not necessarily in scale as some components may be shown to be enlarged or to be out of proportion relative to the size in actual implementation in order to clearly illustrate the concept of the present disclosure. In the drawings.

DETAILED DESCRIPTION

Figure 1:
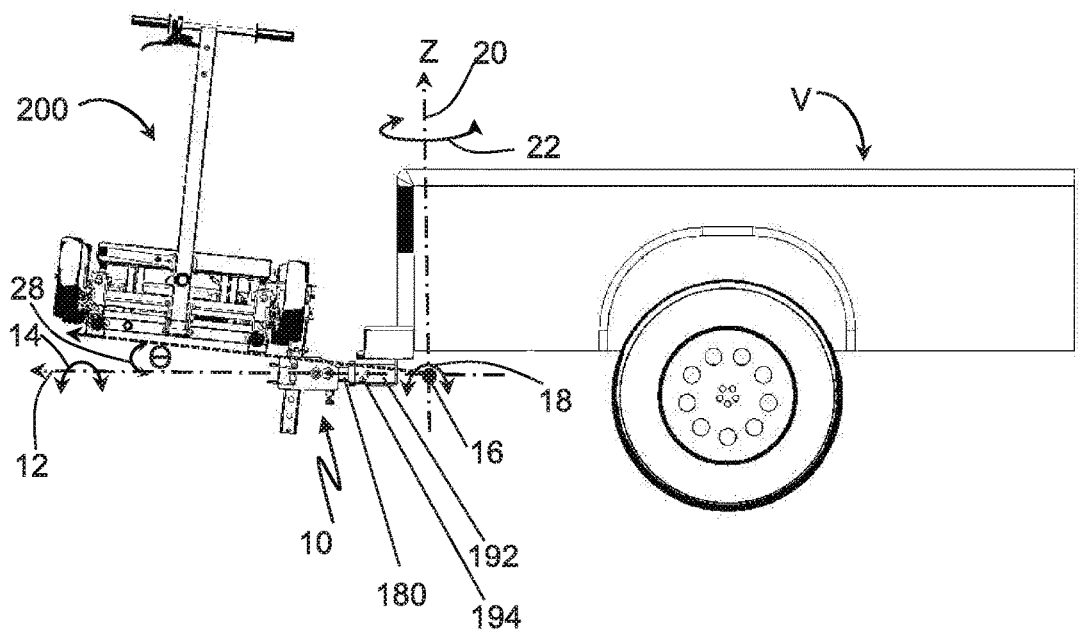
FIG. 1 is a first side elevation view of an embodiment of a vehicle hitch adapter comprising a pitch lock system, the vehicle hitch adapter illustrated coupling a vehicle hitch mounted cargo cart to a rear of a vehicle shown in part and, in one embodiment, the vehicle hitch mounted cargo cart is in the form of, but not limited to, a vehicle hitch mounted scissor lifted cargo cart.

Considering the drawings, wherein like reference numerals denote like parts throughout the various drawing figures, reference numeral 10 is directed to an embodiment of a vehicle hitch adapter comprising a pitch lock system wherein, in one embodiment, the vehicle hitch adapter 10 is employed for, but not limited to, removably coupling a scissor lifted hitch mounted cargo cart 200 to a rear of a vehicle V.

Orthogonal Coordinates

Figure 2:
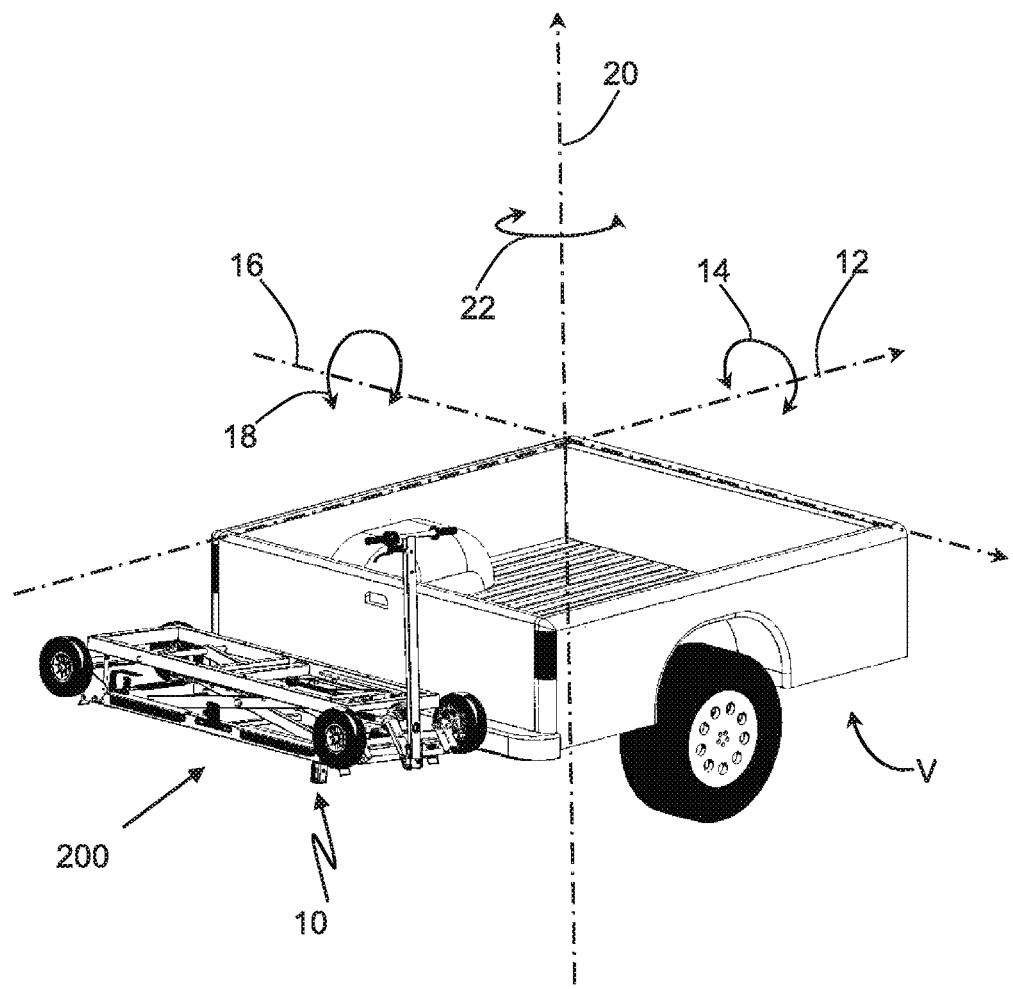
FIG. 2 is a rear and cart steering side perspective view of an embodiment of the vehicle hitch mounted scissor lifted cargo cart and a rear side perspective view of an embodiment of the vehicle in part with an embodiment of the vehicle hitch adapter interposed therebetween for coupling an embodiment of the vehicle hitch mounted scissor lifted cargo cart to the rear of the vehicle.

Referring to FIGS. 1 and 2, a coordinate system of three mutually perpendicular or orthogonal coordinate axes is defined for the vehicle V, the removably coupled vehicle hitch adapter 10, and the cargo cart 200 as comprising a longitudinal axis 12 with rotation thereabout defined as roll 14, a traverse or lateral axis 16 with rotation thereabout defined as pitch 18, and a vertical axis 20 with rotation thereabout defined as yaw 22. In general, six degrees of freedom for a geometric body are defined by these three rotational translations in combination with linear translations along the three orthogonal axes.

Overview

Figure 3:
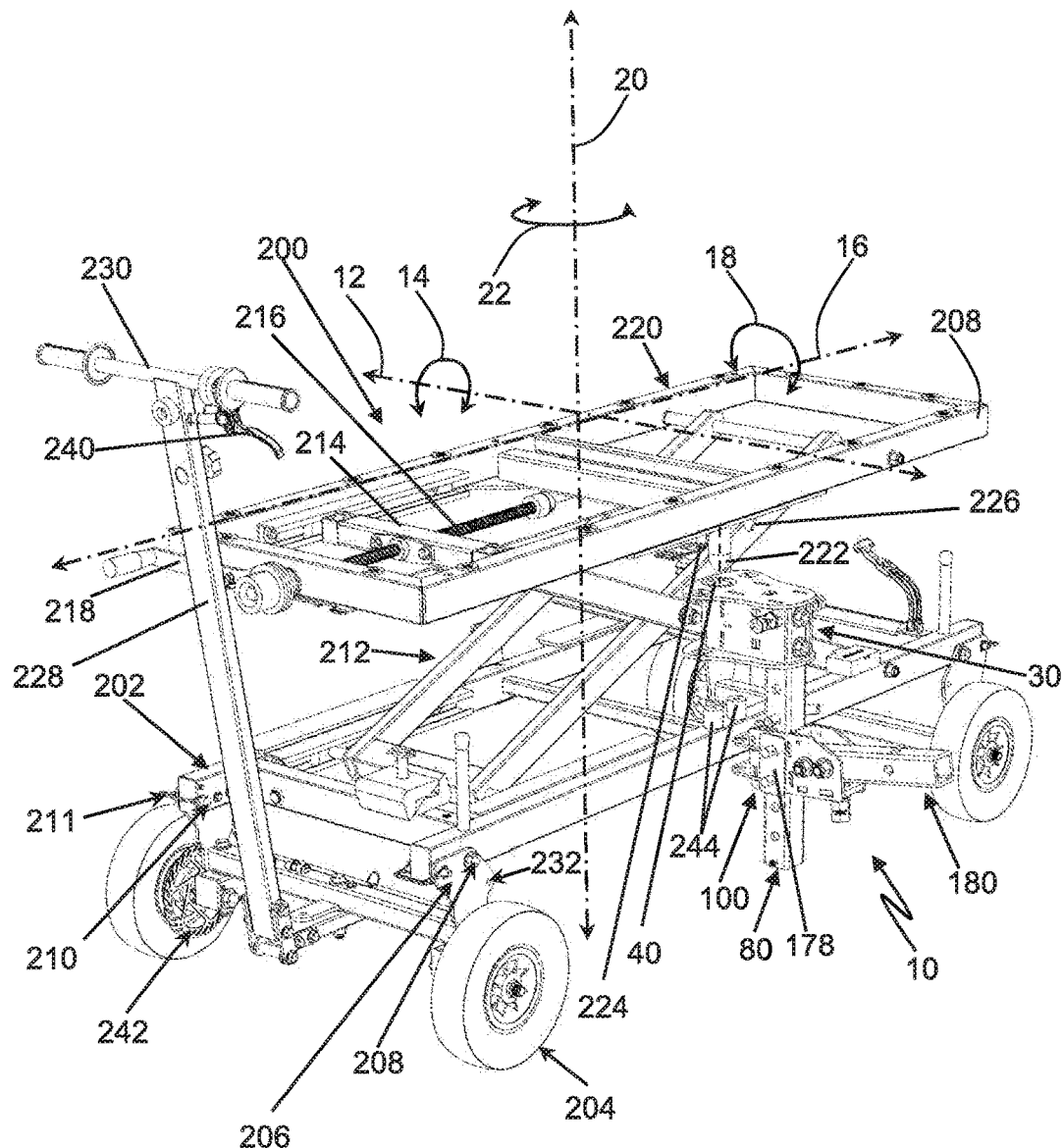
FIG. 3 is a first side and front or anterior side perspective view of an embodiment of the vehicle hitch adapter juxtaposed in a coupling position with respect to a cart steering side and front side perspective view of an embodiment of the vehicle hitch mounted scissor lifted cargo cart.

In one embodiment, and referring to FIG. 3, the vehicle hitch adapter 10 comprises a mounting box assembly 30 surmounting and operatively coupled to a height adjustment post 80 that is adjustably received through a pitch box assembly 100 that adjustably supports a receiver tongue 180.

Now, referring back to FIG. 1, the receiver tongue 180 removably couples with a vehicle hitch receiver 192 attached to the vehicle V and secured thereto by a hitch pin 194, preferably an anti-rattle hitch pin. As illustrated, the vehicle hitch adapter 10 comprises a forward pitch angle theta θ about the traverse or lateral axis 16 wherein the forward pitch angle theta θ can be defined in degrees and is relative to a plane generally parallel to the lateral axis 16 and the longitudinal axes 12 that, in turn, can generally define a plane of a surface such as, but not limited to, a loading area, a parking area, or a road. In one embodiment, the forward pitch carry angle theta θ is, but not limited to, about 4.7 degrees plus or minus one degree or less and although less efficient the forward pitch carry angle theta θ can range up to, but not limited to, about 12 degrees.

Mounting Box Assembly

Referring to FIGS. 4 through 8, and in one embodiment, the mounting box assembly 30 comprises a top or superior bell shaped planar plate 32 generally vertically spaced from a bottom or inferior bell shaped planar plate 42 and comprising three outer planar walls extending therebetween including a steering side plate wall 50, a tail side plate wall 52, and a rear or inner posterior plate wall 54 defining a box having an anterior opened end.

The mounting box assembly 30 further comprises an opened ended hollow cylindrical wall 36 disposed posterior to the inner posterior plate wall 54 wherein the hollow cylindrical wall 36 comprises an interior circumscribing surface 37 extending between an upper open end 38 that is coaxial with a medially posteriorly disposed aperture 34 in the superior bell shaped plate 32 and a lower open end 39 that is coaxial with a medially posteriorly disposed aperture 44 in the inferior bell shaped plate 42 for defining an opened ended pin receiving passageway 40 extending through hollow cylindrical wall 36 and the superior and inferior plates 32, 42.

Additionally, mounting box assembly 30 comprises a first inner medial traverse plate wall 56 anteriorly disposed a distance behind the inner posterior plate wall 54 within the three outer planar walls 50 and 52. In turn, a second inner medial traverse plate wall 60 is disposed anteriorly adjacent the first inner medial traverse plate wall 56 wherein a square chamber 61 is formed having an anterior opened end and an open bottom or inferior end defined by an opening 63 in the bottom or inferior bell shaped plate 42 sized to receive a superior end 84 of the post 80 therethrough.

Figure 5:
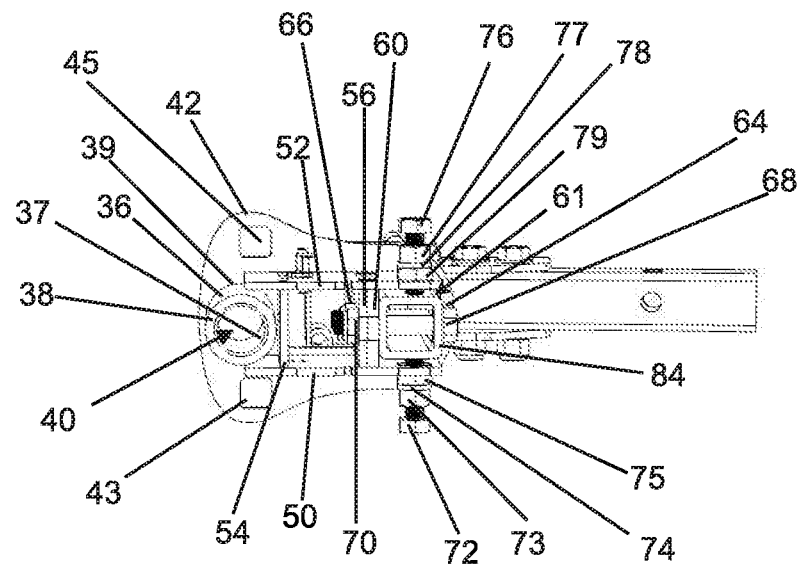
FIG. 5 is a top plan view of an embodiment of the vehicle hitch adapter having a top bell shaped plate removed therefrom for illustration of internals of an embodiment of a mounting box assembly.
Figure 6:
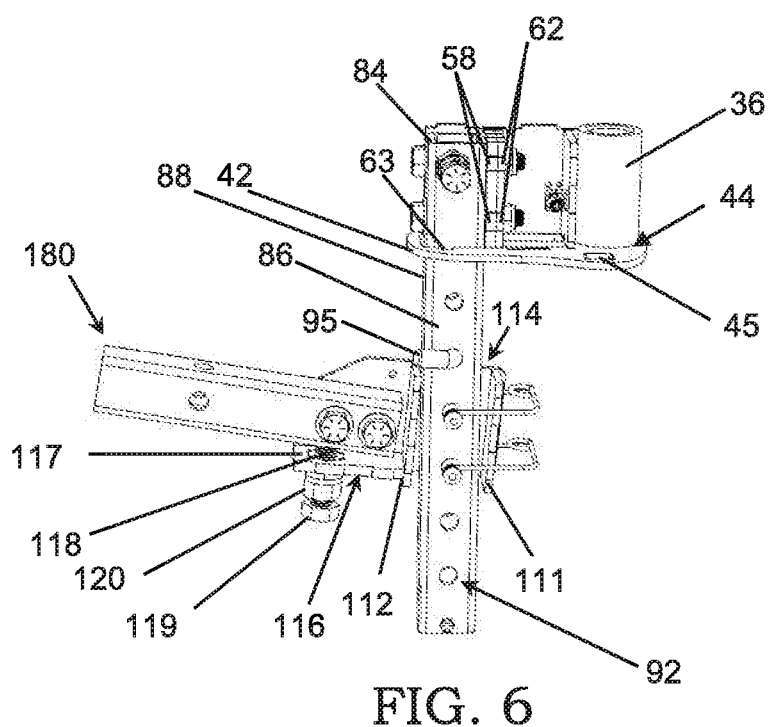
FIG. 6 is a second side elevation view of an embodiment of the vehicle hitch adapter having elements removed for illustrating detail.

As illustrated in FIGS. 5 and 6, plate wall 56 comprises inner medial traverse plate rotation preclusion nut openings 58 and plate wall 60 comprises central openings 62 in contiguous alignment with the rotation preclusion nut openings 58.

Figure 7:
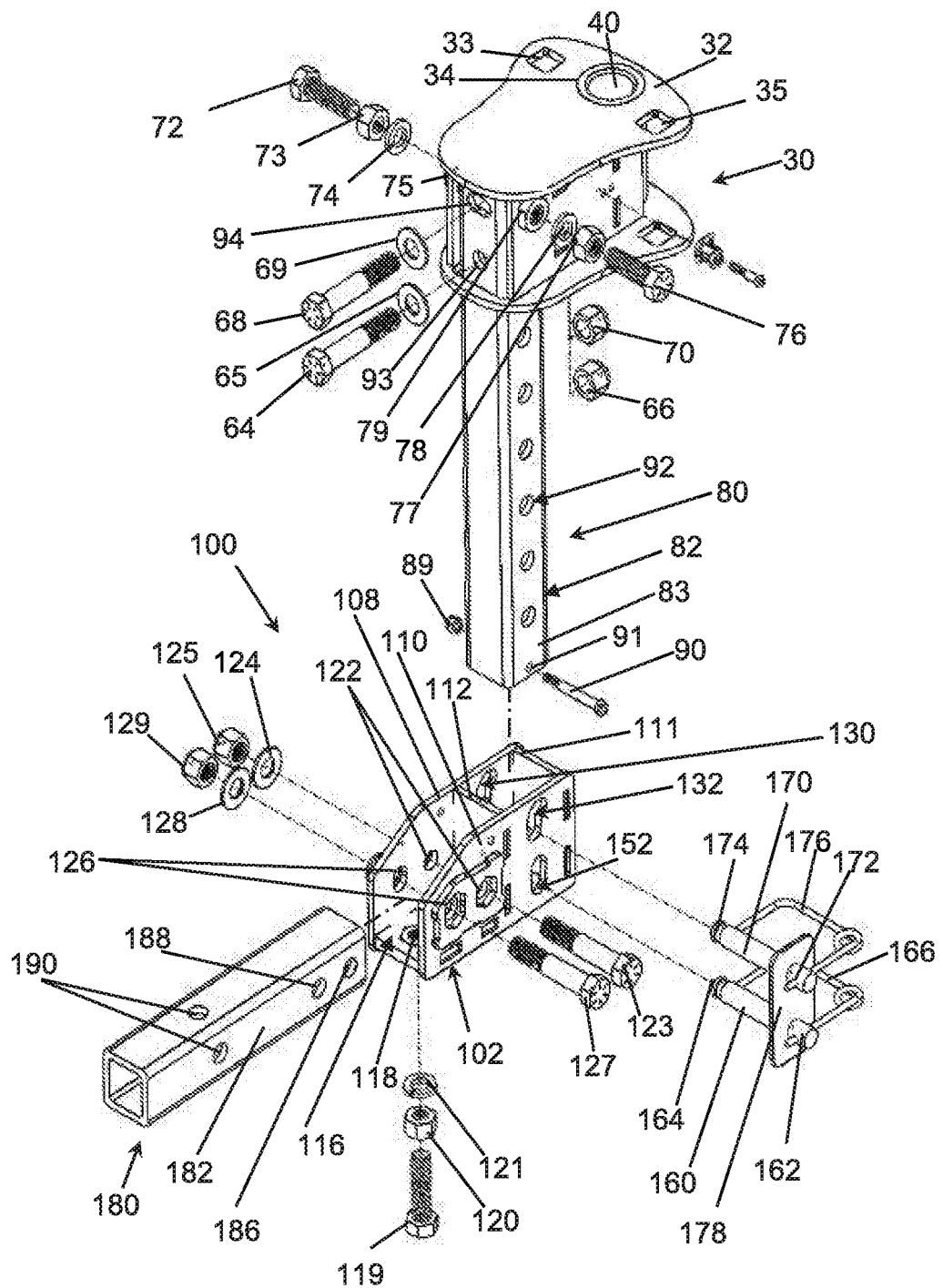
FIG. 7 is exploded parts perspective view of an embodiment of the vehicle hitch adapter comprising the pitch lock system.

Referring to FIGS. 5 through 7, the superior and inferior bell shaped plates 32, 42 respectively comprise the vertically aligned medially posteriorly disposed apertures 34, 44; steering side posteriorly disposed apertures 33, 43, and tail side posteriorly disposed apertures 35, 45 wherein the medially posteriorly disposed apertures 34 and 44 are coaxially aligned with the interior circumscribing surface 37 of opened ended hollow cylindrical wall 36 for defining the opened ended pin receiving passageway 40 as noted above for receipt of a mounting pin 222 of cart 200 as detailed below.

The mounting box assembly 30 further comprises a roll adjustment means comprising a roll adjustment bolt and nut system comprising an inferior longitudinal rear roll adjustment bolt 64 extending through washer 65, then through aperture 93 disposed through a superior portion of post 80 so that bolt 64 threadedly couples with nut 66.

Additionally, the roll adjustment bolt and nut system of the roll adjustment means comprises superior longitudinal rear roll adjustment bolt 68 extending through washer 69, then through aperture 94 through a superior portion of post 80 so that bolt 38 threadedly couples with nut 70.

Furthermore, the roll adjustment bolt and nut system of the roll adjustment means comprises a first or steering-end horizontal roll adjustment bolt 72 threadedly coupled through a first or steering-end horizontal roll adjustment nut 73 and passing through washer 74 to and threadedly through stationary bolt sleeve 75 and into chamber 61.

Moreover, the roll adjustment bolt and nut system of the roll adjustment means comprises a second or tail-end horizontal roll adjustment bolt 76 threadedly coupled through a second or tail-end horizontal roll adjustment nut 77 and passing through washer 78 to and threadedly through stationary bolt sleeve 79 and into chamber 61.

Height Adjustment Post

Referring to FIG. 7, and in one embodiment, height adjustment post 80 comprises a body 82 extending between an inferior end portion 83 and superior end portion 84 (FIG. 5).

Figure 8:
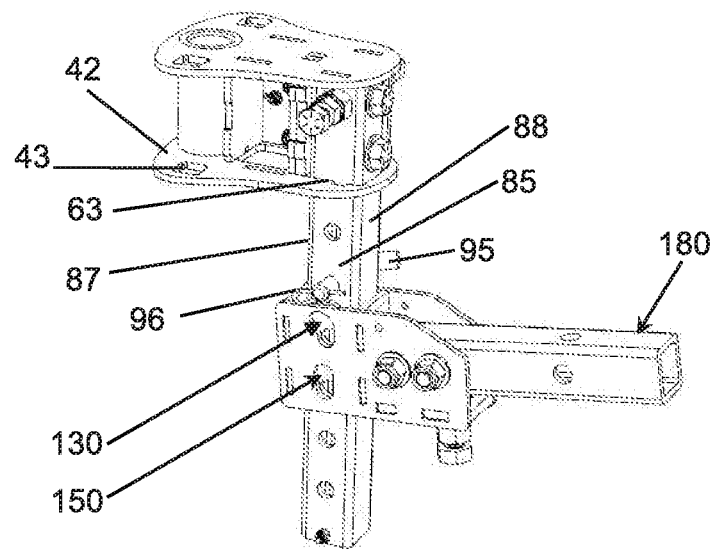
FIG. 8 is a first side perspective view of an embodiment of the vehicle hitch adapter having elements removed for illustrating further detail.

Referring to FIGS. 6 and 8, an embodiment of the body 82 is rectangular or square in shape and comprises a steering end side wall 85, a tail end side wall 86, a rear or posterior side wall 87, and a front or anterior side wall 88 (FIG. 6).

Additionally, and referring to FIG. 7, the height adjustment post 80 is provided with a stop pin nut 89 threadedly coupled to stop pin 90 that extends through opposing stop pin openings 91.

Furthermore, the height adjustment post 80 is further provided with height adjustment through hole pairs 92 comprising pairs of opposing and aligned holes disposed through the steering end side wall 85 and the tail end side wall 86.

Moreover, and as noted above, the height adjustment post 80 is provided with inferior upper post bore holes 93 and superior upper post bore holes 94 for respective receipt of bolts 64, 68 therethrough.

Referring to FIG. 6, a height adjustment L-shaped lock pin 95 passes through a pair of the opposing and aligned post bore holes 92 disposed in post 80 and is secured by a retaining clip 96 passing through an aperture in lock pin 95 as illustrated in FIG. 8.

Pitch Box Assembly

Referring to FIGS. 4, 6, 7, and 9A and in one embodiment, the vehicle hitch adapter 10 further comprises pitch box assembly 100. Pitch box assembly 100 comprises a rectangular shaped pitch box body 102 having a back or posterior end 104, a front or anterior end 106, a first or steering-end longitudinal face 108 spaced from and parallel to a second or tail-end longitudinal face 110 wherein the longitudinal faces 108 and 110 extend between the posterior and anterior ends 104, 106 respectively. A posterior wall 111 closes the posterior end of the pitch box body 102 adjacent posterior end 104. A medial wall 112 partitions the box body 102 into an posterior pitch lock passageway 114 for receiving post 80 therethrough and a front or anterior landing area 116 comprising an anterior landing or abbreviated bottom wall 117 attached on respective longitudinal sides to first and second longitudinal faces 108, 110 and comprising a centrally located threaded aperture 118.

Referring to FIGS. 6 and 7, the pitch box assembly 100 further comprises a anterior landing vertical pitch adjustment bolt 119, nut 120, and washer 121 wherein bolt threads through nut 120, passes through washer 121, and adjustably threadedly couples with centrally located threaded aperture 118 so when turned in one direction, the bolt pitches the receiver tongue 180 toward the vehicle V and, when turned in an opposite direction, the bolt pitches the receiver tongue 180 relatively away from the vehicle V.

Figure 4:
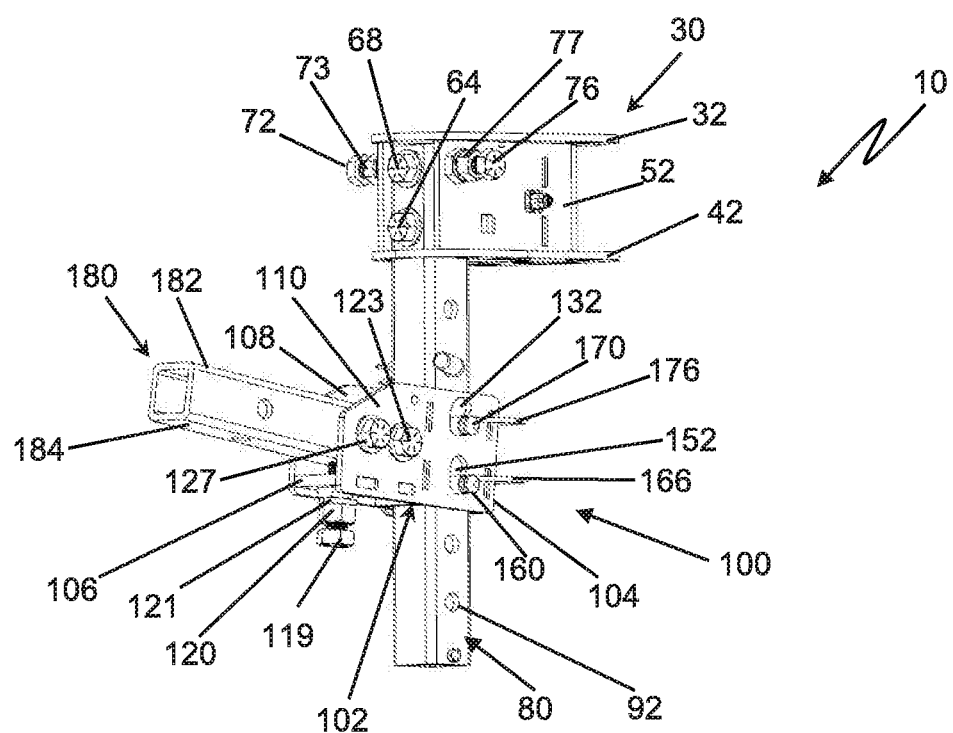
FIG. 4 is a front and second side perspective view of an embodiment of the vehicle hitch adapter comprising the pitch lock system.

Referring to FIGS. 4 and 7, the pitch box assembly 100 further comprises a rear horizontal pitch adjustment bolt 123 that extends through an aligned rear pair of opposing transversely spaced apart horizontal pitch adjustment bolt apertures 122 in box body 102, through a first or rear pair of opposing transversely spaced apart horizontal pitch adjustment receiver tongue bolt apertures 186 disposed in receiver tongue 180, through a washer 124, and threadedly into bolt 125.

Similarly, pitch box assembly 100 further comprises a front horizontal pitch adjustment bolt 127 that extends through an aligned front pair of opposing transversely spaced apart horizontal pitch adjustment bolt apertures 126 disposed in the box body 102 and a second or forward pair of opposing transversely spaced apart horizontal pitch adjustment receiver tongue bolt apertures 188 disposed in receiver tongue 180, through washer 128, and threadedly into bolt 129.

Pitch Lock System—Obround Apertures/Slots

Figure 9A:
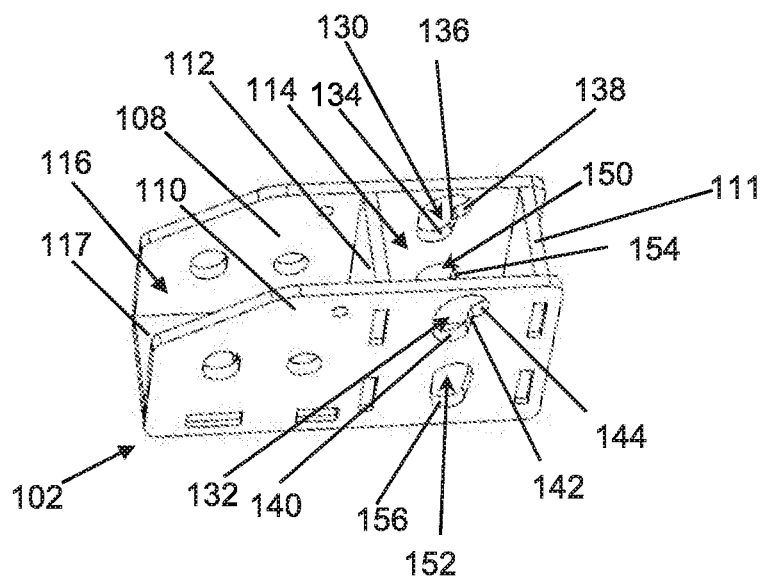
FIG. 9A is a top and second end side perspective view of an embodiment of a pitch box of the pitch lock system of the vehicle hitch adapter.
Figure 9B:
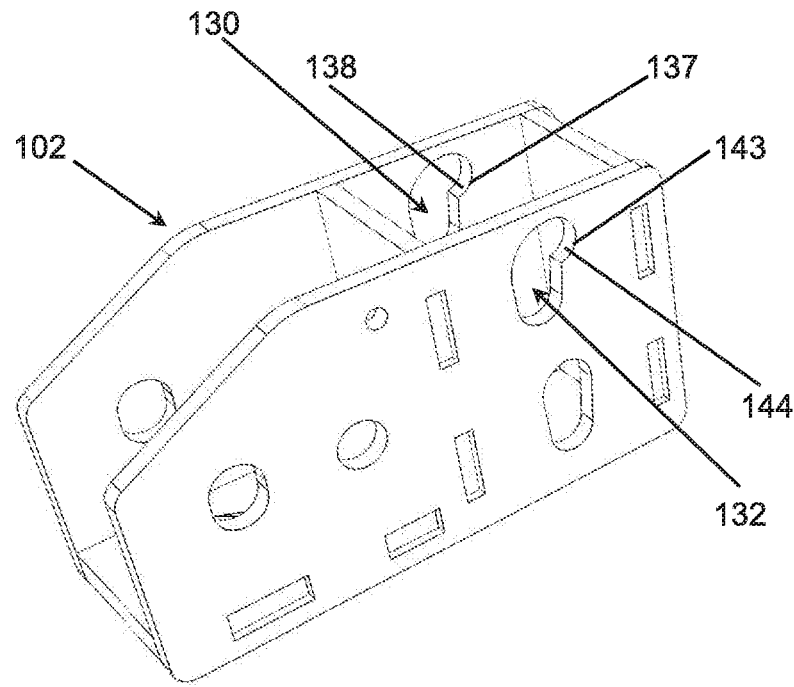
FIG. 9B is a top, anterior side, and second end side perspective view of an embodiment of a pitch box of the pitch lock system of the vehicle hitch adapter.

Referring to FIGS. 9A and 9B, the longitudinal faces 108 and 110 each comprises a vertically extending angled end obround shaped aperture or slot 130 and 132 respectively.

More specifically, vertically extending angled end obround shaped aperture or slot 130 is defined by a superior angled end obround shaped interior surface 134 generally having the form of a flattened cylinder with the sides parallel and the ends hemispherical wherein the transition area between the parallel sides and the superior hemispherical end is posteriorly angled having a slope or inclination surface 136 angularly transitioning into a posteriorly extending generally horizontal notch 137 comprising a posteriorly extending shoulder surface 138.

Similarly, vertically extending angled end obround shaped aperture or slot 132 is defined by an angled end obround shaped interior surface 140 generally having the form of a flattened cylinder with the sides parallel and the ends hemispherical wherein the transition area between the parallel sides and the superior hemispherical end is posteriorly angled having a slope or inclination surface 142 angularly transitioning into a posteriorly extending generally horizontal notch 143 comprising a posteriorly extending shoulder surface 144.

Accordingly, the pitch lock system comprises a pair of transversely opposing spaced apart vertically extending posteriorly angled end obround shaped apertures 130, 132 having respective posteriorly extending shoulder surfaces 138, 140 formed by one angled hemispherical end of the respective obround shaped apertures 130, 132.

Additionally, and still referring to FIGS. 9A and 9B, the longitudinal faces 108 and 110 each further comprises a vertically extending obround shaped lower aperture 150 and 152 respectively.

Vertically extending obround shaped lower aperture 150 is defined by a obround shaped interior surface 154 generally having the form of a flattened cylinder with the sides parallel and the ends hemispherical.

Similarly, vertically extending obround shaped lower aperture 152 is defined by a obround shaped interior surface 156 generally having the form of a flattened cylinder with the sides parallel and the ends hemispherical.

Accordingly, apertures 150 and 152 form a pair of transversely opposing spaced apart vertically extending obround shaped apertures or slots 150 and 152 respectively disposed below the vertically extending angled end obround shaped slot 130 and 132 with the upper slots 130, 132 located closer to the carrying vehicle V than the lower slots 150, 152 as illustrated in, for example, FIGS. 10 and 11.

Pitch Lock Pin System for Pitch Lock System

Referring to FIG. 7, the pitch lock system further comprises a pitch lock pin system comprising an inferior pin 160 that extends through the opposing pair of transversely opposing spaced apart vertically extending obround shaped apertures 150, 152 by way of passing through one pair of opposed hole pairs 92 disposed in the height adjustment post 80 and contained within posterior pitch lock passageway 114.

Inferior pin 160 is captured by an inferior pin hook 166 coupling between an aperture tail-end 162 and an opposing grooved end 164 of the inferior pin 160.

The pitch lock pin system further comprises a superior pin 170 that extends through the pair of transversely opposing spaced apart vertically extending angled end obround shaped apertures 130, 132 by way of passing through one pair of opposed hole pairs 92 disposed in the height adjustment post 80 and contained within posterior pitch lock passageway 114.

Superior pin 170 is captured by a superior pin hook 176 coupling between an aperture tail-end 172 and an opposing grooved end 174 of the superior pin 170.

As illustrated in FIGS. 3 and 7, a pin plate 178 is utilized to further secure the inferior and superior pins 160, 170 in position while in use and operation discussed below.

Receiver Tongue 180 and Vehicle Hitch Receiver

Referring to FIGS. 4 and 7, and as noted above the vehicle hitch adapter 10 further comprises the receiver tongue 180. Receiver tongue 180 comprises body 182 having a lower inferior surface 184 to which the posterior landing vertical pitch adjustment bolt 119 vertically abuts for pitch adjustment.

Body 182 also comprises the pair of opposing transversely spaced apart horizontal pitch adjustment receiver tongue bolt apertures 188 and the adjacent pair of opposing transversely spaced apart horizontal pitch adjustment receiver tongue bolt apertures 186 for respectively receiving bolts 127 and 123 as noted above.

Body 182 further comprises vehicle tow hitch pin bores 190 utilized for the body 182 of the receiver tongue 180 to be removably coupled with the vehicle hitch receiver 192 (FIG. 1) attached to the vehicle V and secured thereto by the hitch pin 194, preferably an anti-rattle hitch pin.

Cart

Referring to FIG. 3, and in one embodiment, cart 200 comprises a lower rectangular frame 202 supported by wheels 204 each attached via pivoting gussets 206 utilizing a pivot bolt 208 and a separate securing pin 210 captured in place by a wrap-around spring pin 211. In one embodiment, the rear wheels are connected to a rear axle assembly and the front wheels are connected to a steering wheel assembly operatively coupled to steering handle 228 surmounted by a steering bar 230 which supports a brake lever operatively coupled to a front disk brake system 242 operatively coupled to each front wheel.

In turn, the lower rectangular frame supports a scissor lift 212 surmounted by an upper rectangular frame 220.

The scissor lift 212 comprises a thrust bar 214 and a thrust screw 216 operated by a scissor lift handle 218 to raise and lower the upper rectangular frame 220 relative to the lower rectangular frame 202 when the wheels are on the ground or other supporting surface and to raise and lower the lower rectangular frame 202 relative to the upper rectangular frame 220 when the upper rectangular frame 220 is held in a relative stationary position as exemplified by when the cart 200 is attached to the vehicle V by way of the vehicle hitch adapter 10 as illustrated in FIGS. 1, 2, 12, and 15.

Example Materials

In one embodiment the frames 202 and 220 are made from, but not limited to, 6061-T6 Aluminum tube, routed/milled and welded. The hitch adapter system is made from, but not limited to, steel, 1144 steel and AR400 steel, laser cut and welded. In one embodiment, all parts are powder coated for preservation and aesthetics. In one embodiment the wheels are, but not limited to, solid urethane foam.

Use and Operation

In use and operation, and referring to the drawings, to install the vehicle hitch adapter 10, the receiver tongue 180 is inserted into hitch 192 attached to the vehicle V and secured using hitch pin 194. In one embodiment, the hitch 192 is any two inch Class III or greater tow hitch. As a general rule, the top of the vehicle hitch adapter 10 should be three feet off the ground, but no higher. Then, the double pins 160, 170 are removed and the height adjustment post 80 slide to the desired height within the pitch box 102 followed by the replacement of the pins 160, 170 as illustrated in FIG. 11 and secured with the wrap-around spring pins 166, 176 respectively.

Adjustments

If required, the pitch and roll of the vehicle hitch adapter 10 can be adjusted as follows.

Pitch

To adjust the pitch, the angle toward or away from the vehicle, the vehicle hitch adapter 10 is mounted on the vehicle V as noted above and pitch is observed. Then, the cart 200 is removed prior to adjusting the vehicle hitch adapter 10.

To adjust the pitch towards the vehicle, both horizontal pitch adjustment bolts 123, 127 are loosened (but not removed) using a wrench. Then, the vertical pitch adjustment nut 120 is loosened. Next, the vertical pitch adjustment bolt 119 is tightened to the desired angle, then bolts 123, 127 and nut 120 retightened. A nut locking fluid is recommended.

To angle the pitch away from the vehicle, the same process is followed as above, but the vertical pitch adjustment bolt 119 is turned in the opposite direction.

Roll

To adjust the roll, angle side to side, of the vehicle hitch adapter 10 is initially mounted on the vehicle V as described above and the levelness of the adapter 10 is observed. Then the vehicle hitch adapter 10 is removed prior to adjusting it.

To adjust the roll left or right, both rear roll adjustment bolts 64, 68 are loosened (but not removed) using a wrench. Then, both horizontal roll adjustment nuts 73, 77, (FIGS. 5 and 7) are loosened (but not removed). Next, the roll adjustment bolts 72, 76 are tightened or loosened to push the mounting box left or right. Once level is achieved, the horizontal roll adjustment nuts 73, 77 and the rear roll adjustment bolts 64, 68 are retightened. Again, nut locking fluid is recommended.

In one aspect, the vehicle hitch adapter 10 is configured to intentionally store energy into a vehicle suspension system and then trigger that stored energy to do work in the form of releasing stored potential of the cart 200 to convert to kinetic energy in order to establish and lock the cart 200 into a particular theta pitch forward riding or transport position on the vehicle as further detailed below.

Mounting to Vehicle

Figure 10:
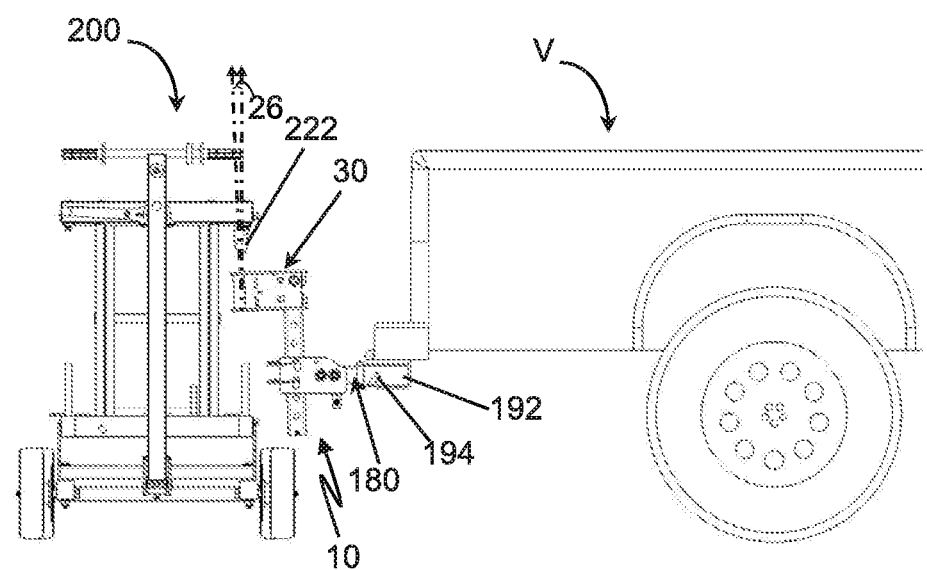
FIG. 10 is a first side elevation view of an embodiment of the vehicle hitch adapter connected to the vehicle shown in part and the vehicle hitch mounted scissor lifted cargo cart situated to align a pin on the scissor lifted cargo cart with an aperture in an embodiment of the mounting box of the vehicle hitch adapter.
Figure 11:
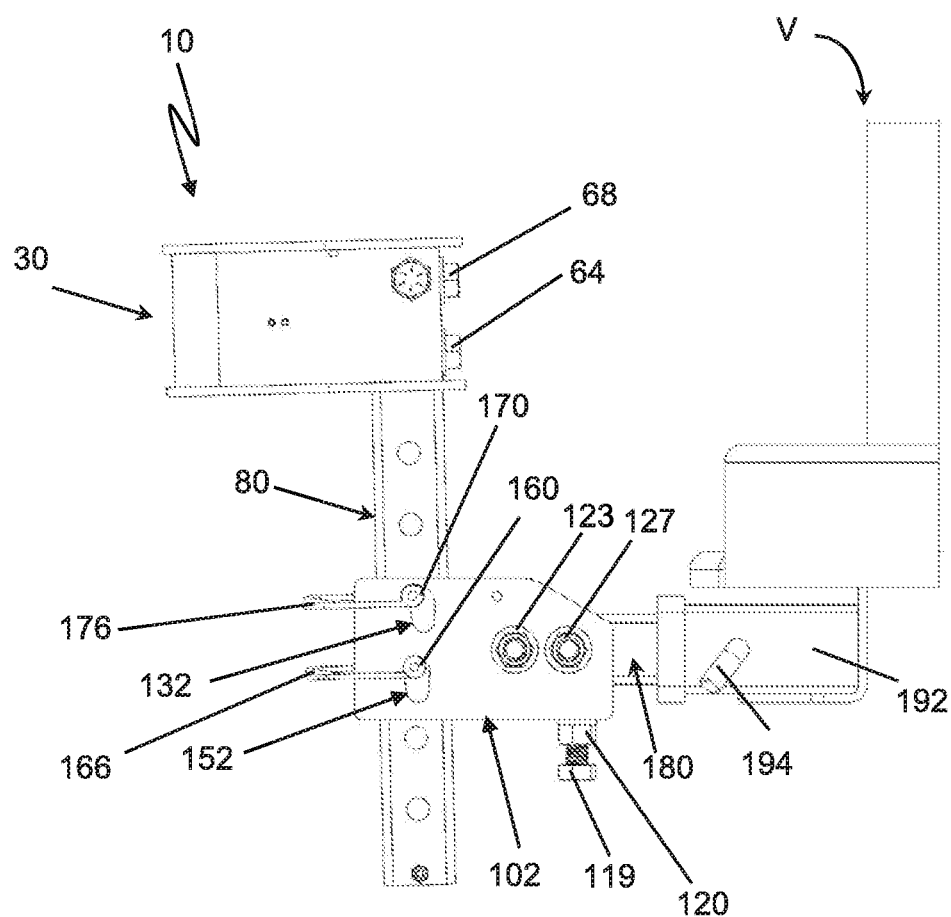
FIG. 11 is a first side elevation view of an embodiment of the vehicle hitch adapter in a first, potential energy, loaded position.

The mounting box assembly 30 is slightly pulled up and posteriorly so that the pin 170 is in the loading position as illustrated in FIG. 11. On level ground, cart 200 is rolled to the rear of the vehicle V and positioned perpendicular to the vehicle hitch adapter 10 as illustrated in FIG. 10.

Next, the upper frame 220 of the cart 200 is raised utilizing scissor lift handle 218 until the mounting pin 222 is higher than the mounting box assembly 30 as illustrated in FIG. 10.

Then, maneuver the cart 200 so the mounting pin 222 is directly above hole 40 in the mounting box assembly 30 as illustrated in FIGS. 3 and 10.

Next, turn the lift handle 218 in the counter-clockwise direction to lower the cart 200 onto the vehicle hitch adapter 10 while locating the steering end tab 224 and tail-end tab 226 with respective apertures 33 and 35 disposed in plate 32 (FIG. 7).

Figure 12:
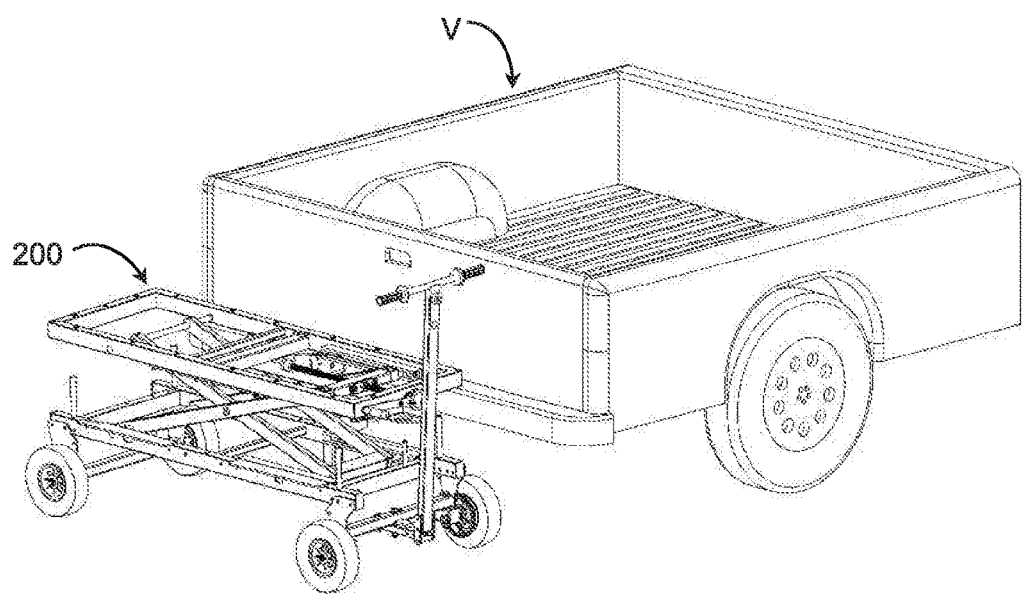
FIG. 12 is a rear and steering side perspective view of an embodiment of the vehicle hitch mounted scissor lifted cargo cart being elevated while being coupled to the vehicle with the vehicle hitch adapter so as to cause suspension compression of the vehicle as illustrated.
Figure 13:
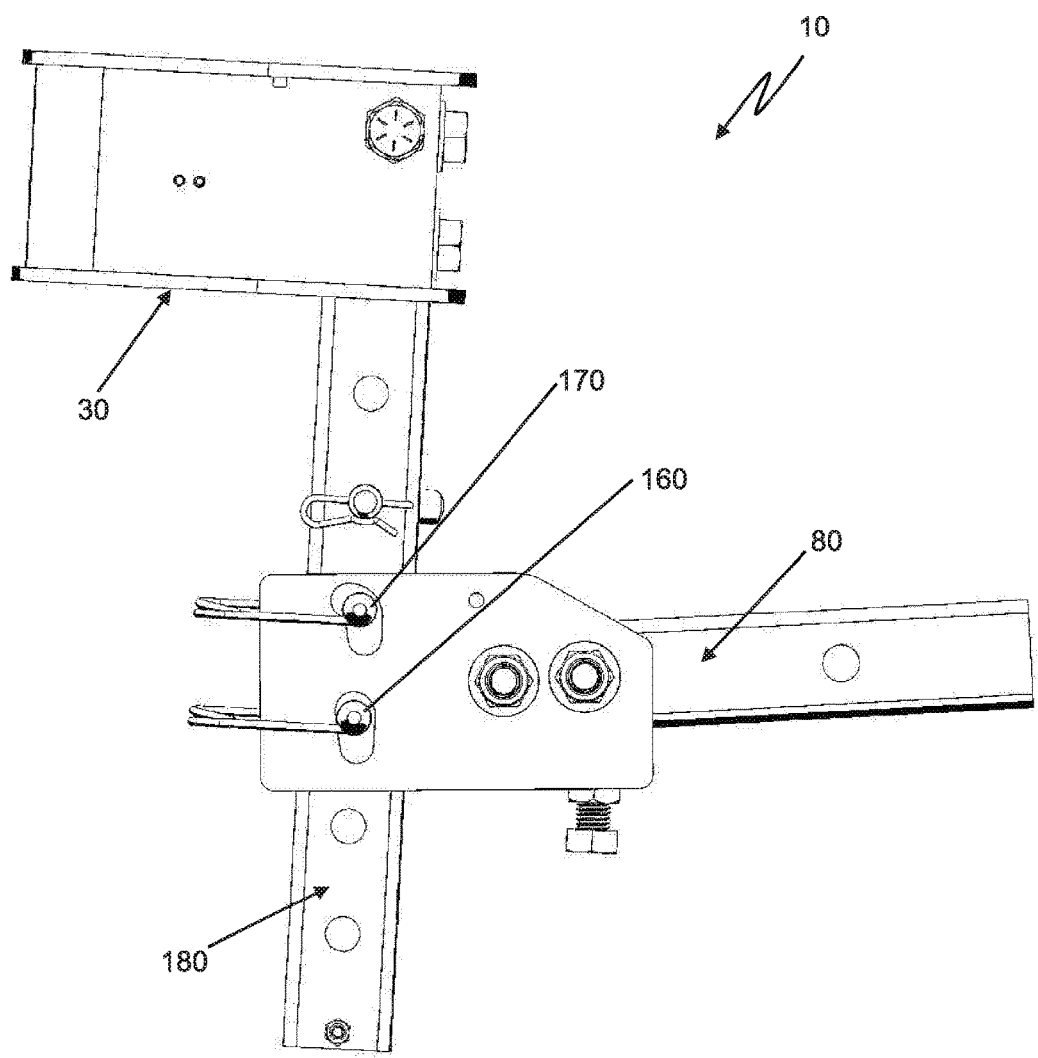
FIG. 13 is a first side elevation view of an embodiment of the vehicle hitch adapter in a second, dropping off shelf, potential energy releasing or unloading state.
Figure 14:
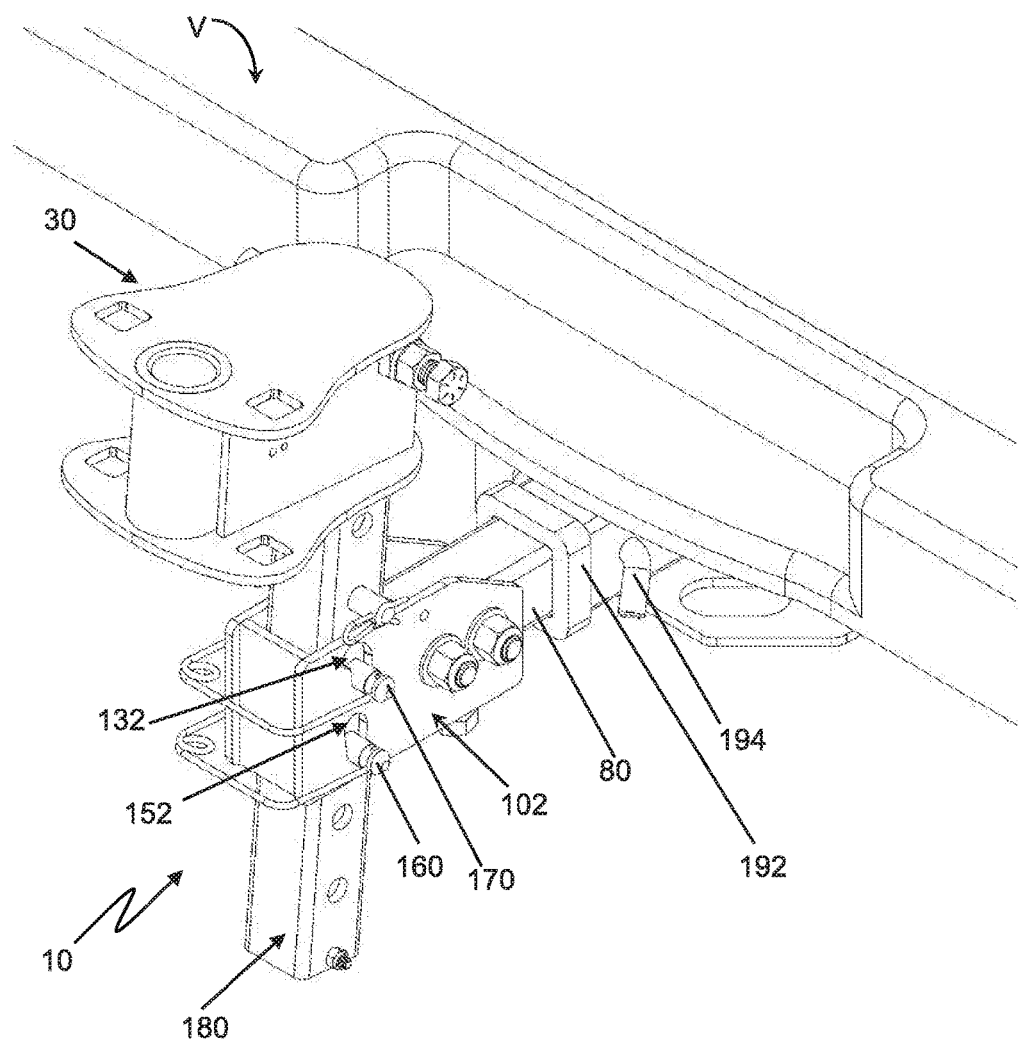
FIG. 14 is a rear and first side perspective view of an embodiment of the vehicle hitch adapter coupled to the vehicle and in a third, pitch forward, potential energy unloaded state and transport position.
Figure 15:
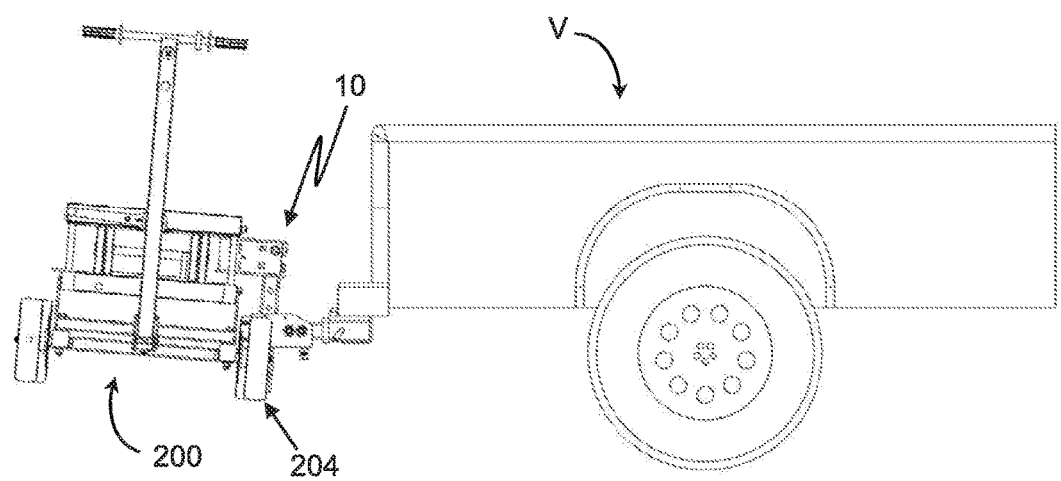
FIG. 15 is a first side elevation view of an embodiment of the vehicle hitch adapter connected to the vehicle and the vehicle hitch mounted scissor lifted cargo cart in the third, pitch forward, potential energy unloaded state and transport position with the axially pivotal wheels in a down position.

Once one feels the weight of the cart 200 transfer from the lower frame to the vehicle's suspension as illustrated in FIG. 12, turning the handle 218 is stopped and one moves to the front of the cart 200. By giving the cart 200 a slight push, the pin 170 will slide off the shoulders 138, 144 as illustrated in FIG. 13 and down into the transport position as illustrated in FIG. 14 with FIG. 15 also illustrating the cart 200 pitched forward in a transport position on the vehicle V with the wheels 204 in a down position. In synchrony with the pin 170, inferior pin 160 slides from the upper to the lower position in the obround shaped apertures 150, 152 as illustrated in FIGS. 13 and 14.

Forward and Rearward Pitch Mounting Angle

Referring to FIGS. 9A, 9B, 11 and 16, shoulders 138, 144 provide for the pitch of the mounting box assembly 30 to be adjusted toward or away from the vehicle V via a rearward pitch mounting angle 26 and a forward pitch mounting angle 28 (FIG. 16) for aligning pin 222 of the cart 200 with the pin receiving passageway 40 of the mounting box assembly 30.

Figure 16:
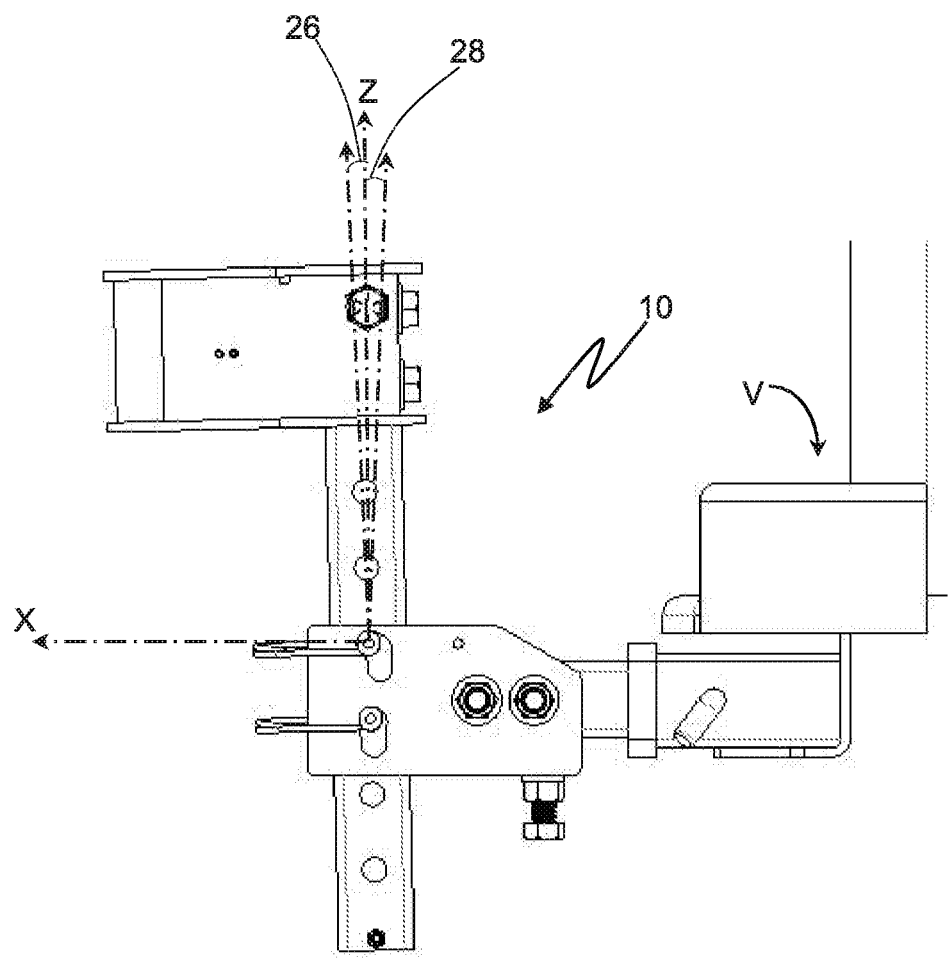
FIG. 16 is a first side elevation view of an embodiment of the vehicle hitch adapter in a potential energy loading position with a mounting box of the vehicle hitch adapter having a rearward and forward pitch mounting angle for assisting in cart and vehicle hitch adapter coupling.

In one embodiment, and as illustrated in FIG. 16, the rearward pitch mounting angle 26 is preferably about a negative 2.5 degrees or 2.5 degrees counterclockwise from the vertical axis Z with a variance of about plus or minus one degree or less. Additionally, shoulders 138, 144 can also be configured to provide a rearward pitch mounting angle 26 of up to, but not limited to, about negative 5.0 degrees or 5.0 degrees counterclockwise.

In one embodiment, and as illustrated in FIG. 16, the forward pitch mounting angle 28 is preferably about 2.5 degrees or 2.5 degrees clockwise from the vertical axis Z with a variance of about plus or minus one degree or less. Moreover, shoulder 138, 144 can also be configured to provide a forward pitch mounting angle 28 of up to, but not limited to, about 5.0 degrees or 5.0 degrees clockwise.

The rearward pitch mounting angle 26 and forward pitch mounting angle 28 both allow for movability or free play of the mounting box assembly 30. Accordingly, this movability or free play allows the mounting box assembly 30 to be moved relative to the pin 222 of the cart 200 during the process of loading the cart vehicle hitch adapter 10 coupled to the vehicle V thereby providing cart pin alignment means for aligning the pin 222 of the cart 200 with the pin receiving passageway 40 of the mounting box assembly 30 so that the pin 222 can be easily received therein for coupling the cart 200 to the rear of the vehicle V via the vehicle hitch adapter 10.

In addition, and in one example embodiment, the mounting pin 222 has a bullet shaped configuration comprising an elongated cylindrical member terminating to a round, bullet nose end for eliminating the need to squarely align the cart with the mounting box assembly 30 to engage the mounting pin 222 therein.

Furthermore, rotational alignment is provided by two the tapered tabs 224, 226 which respectively drop into two square or rectangular cutouts 33, 35 in the top plane of the receiving passageway 40.

Accordingly, if the cart 200 is misaligned the scissor lift 212 still picks the wheels 204 up off the ground and when the friction between the wheels 204 and the ground is broken the cart 200 is rotated around the mounting pin 222 into correct alignment as the tapered tabs 224, 226 slide into their respective cutouts 33, 35. Alignment is secured once the tapered tabs 224, 226 are completely seated. And, the pin 222 and tabs 224, 226 are locked into position when the lower portion of the cart is fully raised and a rubber bumper pair 244 comes into contact with the bottom of the hitch adapter head or bell shaped plate 42, sandwiching the mounting box assembly 30 inside the cart frame so as to prevent the mounting pin 222 from rising up out of the receiving passageway 40 during a heavy bump or in the case of vehicle roll-over.

In one example embodiment, the tapered mounting pin 222 is greased (as is the round receiver 40) and the taper helps prevent the pin 222 from binding as it is inserted. Moreover, and in one example embodiment, the lip of the receiver 40 is also chamfered to reduce binding.

Pitch Transport Angle

Figure 17:
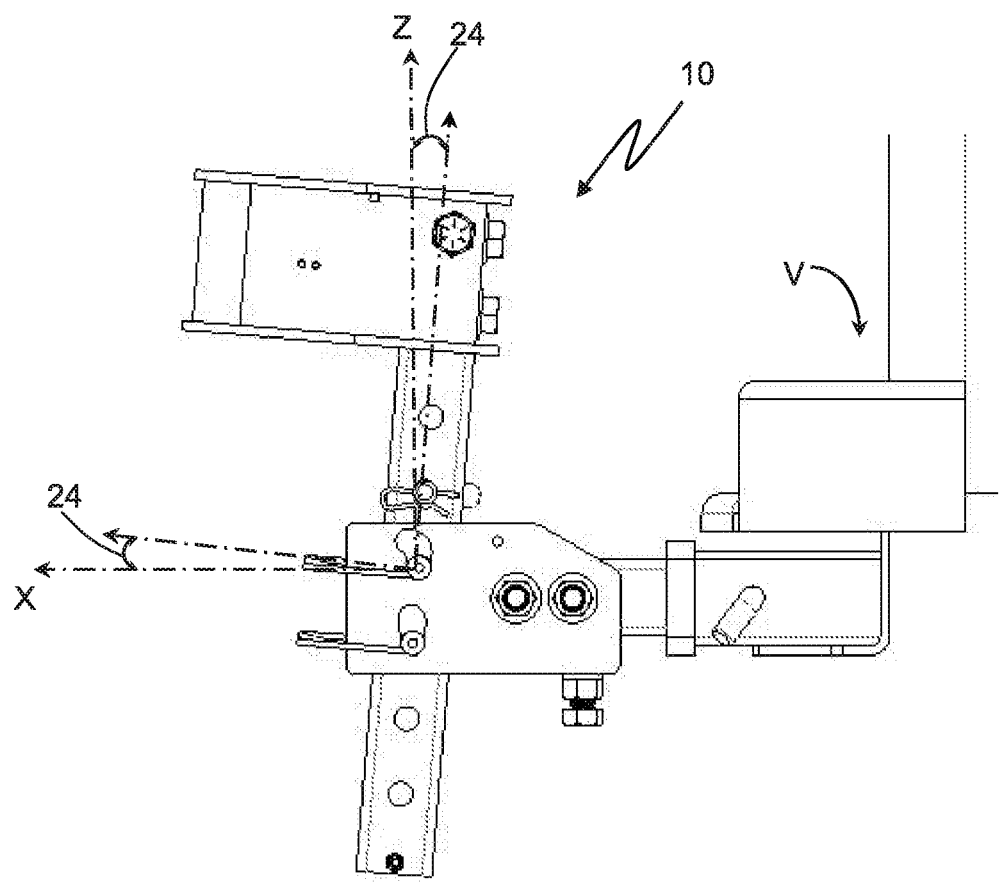
FIG. 17 is a first side elevation view of an embodiment of the vehicle hitch adapter in a cart loaded pitch forward riding or transport position.

Once the forward pitch mounting angle 28 is exceeded, pin 170 falls off the shoulders 138 and 144 and the mounting box 30 along with the coupled cart 200 are disposed in the transport position with mounting box 30 having forward pitch transport angle 24 illustrated in FIG. 17 and defined as the forward pitch angle theta $\theta$ illustrated in FIG. 1 as delineated above.

As illustrated in FIG. 17 and FIG. 1, and in one embodiment, the forward pitch transport angle 24 or forward pitch angle theta $\theta$ is preferably, but not limited to, about 4.7 degrees with a variance of about plus or minus one degree or less and although less efficient the forward pitch transport angle 24 or forward pitch angle theta $\theta$ can range up to, but not limited to, about 12 degrees.

Again in summary, the vehicle hitch adapter 10 is configured to intentionally store energy into a vehicle suspension system and then trigger that stored energy to do work in the form of releasing stored potential of the cart to convert to kinetic energy in order to establish and lock the cart into a particular theta pitch forward riding or transport position on the vehicle.

Nesting Wheels

Figure 18:
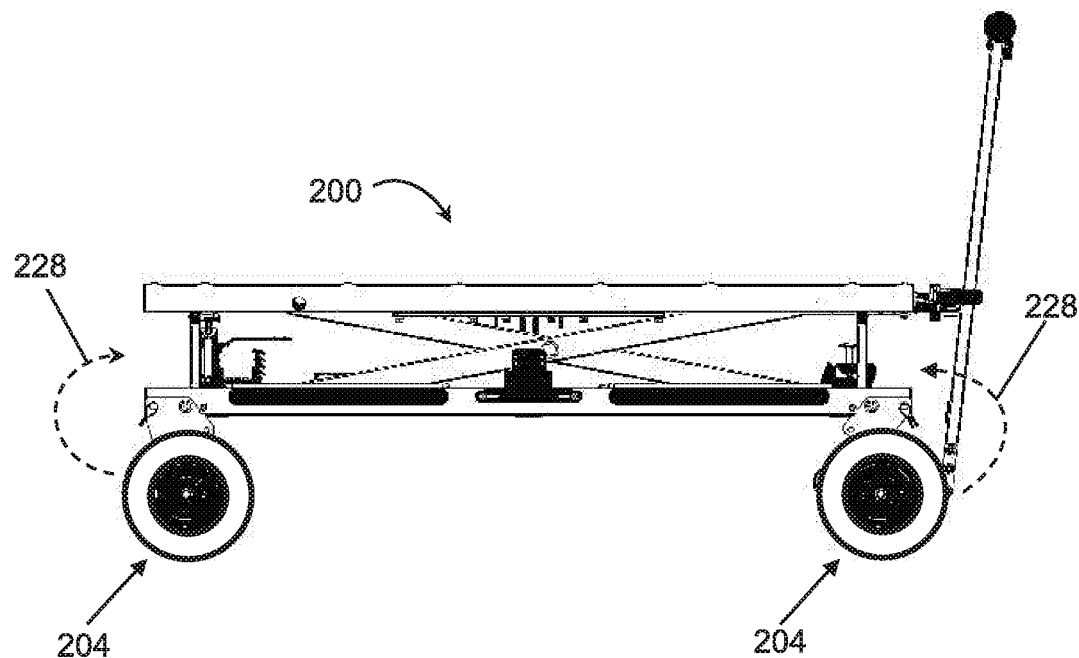
FIG. 18 is a rear side elevation view of an embodiment of the vehicle hitch mounted scissor lifted cargo cart having axially pivotal wheels in a down cargo carry position.
Figure 19:
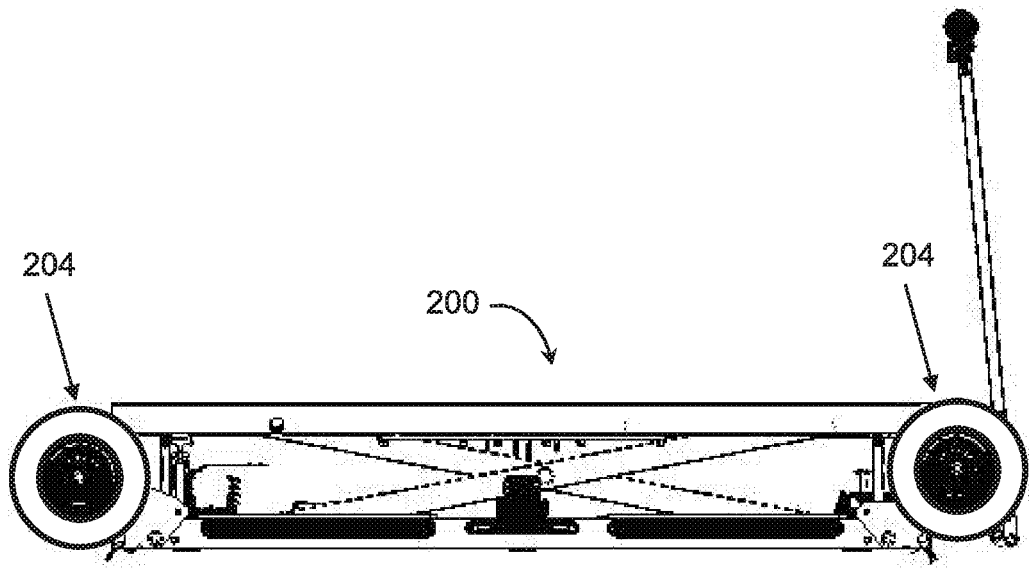
FIG. 19 is a rear side elevation view of an embodiment of the vehicle hitch mounted scissor lifted cargo cart having the axially pivotal wheels in a road clearance transport position as illustrated in FIGS. 1 and 2.

If further ground clearance is needed the wheels 204 transform or pivot along arrows 228 from a down position as illustrated in FIG. 18 to a folded up or nested position above the lower frame 202 as illustrated in FIG. 19.

Referring to FIGS. 3, 18, and 19, the steering end wheels can be nested in the up position by removing each safety spring 211, each leg pins 210, and the steering lock pin 230.

Then, rotate the pivoting gussets 206 half-way up, then rotate steering handle 228 counter-clockwise 180 degrees. Then the leg pins 210 are reinserted into respective gusset holes 232 and the original leg pin holes in the lower frame and secured with safety springs 211, and then the steering handle 228 is secure. To nest the tail end wheels in the up position, remove both safety springs 211 and both leg pins 210. Pull the pivoting gussets 206 to the up position and align the pin holes 232 with the original leg pin holes in the lower frame. Reinsert both leg pins 210 and secure safety springs 211.

Accordingly, the nesting of the wheel provides for a flush planar surface defined by the lower surface of the lower frame assembly.

The above delineation of vehicle hitch adapter 10, including its use and operation, demonstrates the industrial applicability of this present disclosure.

Accordingly, it should be apparent that further numerous structural modifications and adaptations may be resorted to without departing from the scope and fair meaning of the embodiment(s) of the present disclosure as set forth hereinabove and as described hereinbelow by the claims. Hence, the spirit and scope of the appended claims should not be limited to the above delineated description of the embodiment(s) of the present disclosure. And, in the appended claims reference to an element in the singular is not intended to mean "one and only one" unless explicitly so stated, but rather "one or more." Moreover, it is not necessary for a device or method to address each and every problem sought to be solved by the present disclosure, for it to be encompassed by the present claims.

I claim:

1. A vehicle hitch adapter, comprising:
    (a) a mounting box comprising a vertically extending circumscribing wall having an interior circumscribing surface extending between an inferior end and an open superior end for defining a pin receiving passageway having a central vertical axis;
    (b) a height adjustment post having an elongated body extending between a superior end and inferior end, said superior end operatively coupled to said mounting box anteriorly to said pin receiving passageway;
    (c) said body of said height adjustment post comprising an array of a plurality of pairs of opposed spaced apart height adjustment apertures disposed along a longitudinal length of said body of said height adjustment post; and
    (d) a pitch lock system, comprising:
        a pitch box comprising a pair of spaced apart vertically extending pitch plates defining a receiving chamber having a central vertical axis and configured for receiving said inferior end of said height adjustment post therethrough with a pair of said plurality of pairs of opposed spaced apart height adjustment apertures contained within said receiving chamber;
        said pair of spaced apart pitch plates comprising a pair of spaced apart vertically extending slots each defined by a vertically extending interior surface having a lower end defining an at rest state and an upper end comprising an posteriorly directed slot surface comprising a posteriorly directed shelf surface defining a potential energy state;
        a pin extending through said pair of spaced apart vertically extending slots and said pair of said plurality of pairs of opposed spaced apart height adjustment apertures contained within said receiving chamber;
        wherein said pin is supported on each of said shelf surfaces of each of said pair of spaced apart vertically extending slots in said potential energy state wherein said central vertical axis of said pin receiving passageway of said mounting box is posteriorly pitched relative to said central vertical axis of said receiving chamber of said pitch box; and
        wherein said pin is supported on a lower end of each of said pair of spaced apart vertically extending slots in said at rest state.

2. The vehicle hitch adapter of claim 1 wherein said pair of spaced apart vertically extending slots define an upper pair of spaced apart vertically extending slots.

3. The vehicle hitch adapter of claim 2 wherein said pair of spaced apart pitch plates further comprises a lower pair of spaced apart vertically extending slots defined by vertically extending interior surfaces each having a lower hemispherical end defining an at rest position and an upper hemispherical end defining a free state position wherein said lower pair of spaced apart vertically extending slots are disposed in said spaced apart pitch plates at a location vertically below said upper pair of spaced apart vertically extending slots wherein a central vertical axis of said upper pair of spaced apart vertically extending slots is forward of a central vertical axis of said lower pair of spaced apart vertically extending slots.

4. The vehicle hitch adapter of claim 3 wherein said pin defines an upper pin and wherein another pair of opposed spaced apart height adjustment apertures are contained within said receiving chamber.

5. The vehicle hitch adapter of claim 4 further comprising a lower pin extending through said lower pair of spaced apart vertically extending slots and said another pair of opposed spaced apart height adjustment apertures that are contained within said receiving chamber.

6. The vehicle hitch adapter of claim 5 wherein said lower pin is supported in said free state position when said upper pin is supported in said potential energy state with said central vertical axis of said pin receiving passageway of said mounting box pitched rearward at an angle defining a rearward pitch mounting angle relative to said central vertical axis of said receiving chamber of said pitch box.

7. The vehicle hitch adapter of claim 6 wherein said rearward pitch mounting angle ranges from 2.5 degrees to 5.0 degrees.

8. The vehicle hitch adapter of claim 6 wherein said rearward pitch mounting angle is 2.5 degrees.

9. The vehicle hitch adapter of claim 6 wherein said lower pin is supported in said at rest position when said upper pin is supported in said at rest state with said central vertical axis of said pin receiving passageway of said mounting box pitched forward at an angle defining a forward pitch transport angle relative to said central vertical axis of said receiving chamber of said pitch box.

10. The vehicle hitch adapter of claim 9 wherein said forward pitch transport angle ranges from 4.7 degrees to 12 degrees.

11. The vehicle hitch adapter of claim 9 wherein said forward pitch transport angle is 4.7 degrees.

12. The vehicle hitch adapter of claim 9 further comprising a receiver tongue having a first end configured to be received by a vehicle hitch receiver coupled to a rear of a vehicle and a second end operatively coupled between said pair of spaced apart pitch plates of said pitch box anterior to said inferior end of said height adjustment post wherein said pin receiving passageway of said mounting box is pitched away from the rear of the vehicle in said potential energy state and is pitched toward the rear of the vehicle in said at rest state.

13. The vehicle hitch adapter of claim 12 for removeably coupling a cargo cart to the vehicle hitch receiver coupled to the rear of the vehicle wherein said cargo cart comprises a mounting pin configured for mountably coupling within said pin receiving passageway of said mounting box pitched away from the rear of the vehicle in said potential energy state and said mounting pin configured for being retained within said pin receiving passageway of said mounting box pitched toward the rear of the vehicle in said at rest state.

14. A vehicle hitch adapter, comprising:
    (a) a mounting box having a superior end, an inferior end, and a pin receiving passageway;
    (b) a height adjustment post having an elongated body extending between a superior end and inferior end of said height adjustment post, said body comprising an array of a plurality of pairs of opposed spaced apart height adjustment apertures disposed along a longitudinal length of said body, and said superior end of said height adjustment post surmounted by and operatively coupled to said mounting box; and
    (c) a pitch lock system, comprising:
        a pitch box comprising a pair of spaced apart pitch plates defining a receiving chamber between said pair of spaced apart pitch plates for said inferior end of said height adjustment post to pass therethrough with at least two consecutive pairs of said plurality of pairs of opposed spaced apart height adjustment apertures contained within said receiving chamber defining an upper pair of opposed spaced apart height adjustment apertures and a lower pair of opposed spaced apart height adjustment apertures contained within said receiving chamber;
        said pair of spaced apart pitch plates comprising a set of spaced apart vertically extending angled end obround shaped slots defined by vertically extending angled end obround shaped interior surfaces having a lower hemispherical end defining an at rest state and an upper hemispherical end posteriorly angled to form a shoulder defining a potential energy state;
        said pair of spaced apart pitch plates comprising a set of spaced apart vertically extending obround shaped slots located vertically below said set of spaced apart vertically extending angled end obround shaped slots and defined by vertically extending obround shaped interior surfaces having a lower hemispherical end defining an at rest position and an upper hemispherical end defining a free state position;
        a first pin configured for extending through said set of spaced apart vertically extending angled end obround shaped slots and said upper pair of opposed spaced apart height adjustment apertures wherein said pin is supported on said shoulder in said potential energy state and is supported on said lower hemispherical end in said at rest state; and
        a second pin configured for extending through said set of spaced apart vertically extending obround shaped slots and said lower pair of opposed spaced apart height adjustment apertures wherein said second pin is located at said upper hemispherical ends of said set of spaced apart vertically extending obround shaped slots defining said free state position when said first pin is in said potential energy state and wherein said second pin is located at said lower hemispherical ends of said set of spaced apart vertically extending obround shaped slots defining said at rest position when said first pin is in said at rest state.

15. The vehicle hitch adapter of claim 14 further comprising a receiver tongue having a first end configured to be received by a vehicle hitch receiver coupled to a rear of a vehicle and a second end operatively coupled between said pair of spaced apart pitch plates of said pitch box anterior to said inferior end of said height adjustment post wherein said pin receiving passageway of said mounting box is pitched away from the rear of the vehicle in said potential energy state and is pitched toward the rear of the vehicle in said at rest state.

16. The vehicle hitch adapter of claim 15 for removeably coupling a cargo cart to the vehicle hitch receiver coupled to the rear of the vehicle wherein said cargo cart comprises a vertically downwardly extending mounting pin configured for removeably coupling within said pin receiving passageway of said mounting box pitched away from the rear of the vehicle in said potential energy state and configured for being retained within said pin receiving passageway of said mounting box pitched toward the rear of the vehicle in said at rest state.

17. The vehicle hitch adapter of claim 16 for removeably coupling said cargo cart to the vehicle hitch receiver coupled to the rear of the vehicle wherein said cargo cart further comprises an upper framework assembly comprising an anterior frame member supporting a pair of spaced apart alignment tabs and said vertically downwardly extending mounting pin interposed between said pair of spaced alignment tabs.

18. The vehicle hitch adapter of claim 17 removeably coupling said cargo cart to the vehicle hitch receiver coupled to the rear of the vehicle wherein said cargo cart further comprises a scissor lift assembly, an upper framework assembly, and a lower framework assembly having a lower planar bottom surface, a steering end, and a tail end wherein said scissor lift assembly is interposed between said upper framework assembly and said lower framework assembly for moving said lower framework assembly and said upper framework assembly relative to one another.

19. The vehicle hitch adapter of claim 18 for removeably coupling said cargo cart to the vehicle hitch receiver coupled to the rear of the vehicle wherein said cargo cart further comprises means for pivotally coupling a first pair of wheels to said steering end of said lower framework assembly and means for pivotally coupling a second pair of wheels to said tail end of said lower framework assembly wherein said first pair of wheels and said second pair of wheels are configured to pivot between a use position vertically below said lower planar bottom surface of said lower framework and a transport position vertically above said lower planar bottom surface of said lower framework.

* * * * *